(12) United States Patent
Cai et al.

(10) Patent No.: US 10,611,411 B2
(45) Date of Patent: Apr. 7, 2020

(54) CHILD DRIFT CAR

(71) Applicant: Goodbaby Child Products Co., Ltd., Kunshan (CN)

(72) Inventors: Hui Cai, Kunshan (CN); Guobao Tong, Kunshan (CN)

(73) Assignee: GOODBABY CHILD PRODUCTS CO., LTD., Kunshan, Jiangsu (CN)

( * ) Notice: Subject to any disclaimer, the term of this patent is extended or adjusted under 35 U.S.C. 154(b) by 188 days.

(21) Appl. No.: 15/541,301

(22) PCT Filed: Dec. 24, 2015

(86) PCT No.: PCT/CN2015/098644
§ 371 (c)(1),
(2) Date: Jun. 30, 2017

(87) PCT Pub. No.: WO2016/110190
PCT Pub. Date: Jul. 14, 2016

(65) Prior Publication Data
US 2018/0022390 A1 Jan. 25, 2018

(30) Foreign Application Priority Data
Jan. 6, 2015 (CN) .................. 2015 2 00048195 U

(51) Int. Cl.
*B62D 21/18* (2006.01)
*B62D 1/20* (2006.01)
(Continued)

(52) U.S. Cl.
CPC .......... *B62D 21/183* (2013.01); *B60K 17/165* (2013.01); *B60K 17/306* (2013.01);
(Continued)

(58) Field of Classification Search
CPC ...... B62D 1/20; B62D 21/183; B62D 23/005; B60K 2001/0416; B60K 17/165;
(Continued)

(56) References Cited

U.S. PATENT DOCUMENTS

| 4,749,205 A * | 6/1988 | Takahashi ................ B62D 7/00 |
| | | 280/124.116 |
| 8,657,716 B1 * | 2/2014 | Whyte .................. F16H 57/031 |
| | | 475/220 |

(Continued)

FOREIGN PATENT DOCUMENTS

| CN | 201442622 U | 4/2010 |
| CN | 203581245 U | 5/2014 |

(Continued)

OTHER PUBLICATIONS

International Search Report for PCT/CN2015/098644, dated Feb. 26, 2016, and its English translation provided by WIPO.

(Continued)

*Primary Examiner* — Joseph M Rocca
*Assistant Examiner* — Maurice L Williams
(74) *Attorney, Agent, or Firm* — Ladas & Parry, LLP

(57) ABSTRACT

A child drift car comprises a car frame, a wheel assembly, a seat, a driving mechanism and a direction control mechanism; the wheel assembly comprises a driving wheel assembly, and the driving wheel assembly comprises driving wheels, and an axle fixedly connected to the driving wheels; the driving mechanism comprises a driver and a transmission device; the direction control mechanism comprises a steering column, a steering wheel fixedly connected to the steering column, and a steering device separately connected to the steering column and the driving wheel assembly; the driving mechanism further comprises a main shaft rotatably disposed on the car frame along its own axis and driven by (Continued)

the transmission device to rotate, and the main shaft is connected to the axle through a universal joint. When the driving wheels turn, the speed of the driving wheels is not affected, and a higher drifting speed can be achieved.

9 Claims, 3 Drawing Sheets

(51) Int. Cl.
*B62D 23/00* (2006.01)
*B62K 9/00* (2006.01)
*B60K 1/04* (2019.01)
*B60K 17/16* (2006.01)
*B60K 17/30* (2006.01)
*B60L 50/50* (2019.01)

(52) U.S. Cl.
CPC ............ *B62D 1/20* (2013.01); *B62D 23/005* (2013.01); *B62K 9/00* (2013.01); *B60K 1/04* (2013.01); *B60K 2001/0416* (2013.01); *B60L 50/50* (2019.02); *B60L 2200/20* (2013.01); *B60Y 2200/81* (2013.01)

(58) Field of Classification Search
CPC ............ B60K 17/306; B60L 2200/20; B60Y 2200/81; B62K 9/00
See application file for complete search history.

(56) References Cited

U.S. PATENT DOCUMENTS

| | | | |
|---|---|---|---|
| 2004/0154854 A1* | 8/2004 | Stephens ................. | B60R 21/13 180/291 |
| 2006/0186699 A1* | 8/2006 | Davis ....................... | B60G 3/06 296/187.01 |
| 2007/0107955 A1* | 5/2007 | Puskar-Pasewicz ... | A61G 5/042 180/65.1 |
| 2008/0006465 A1* | 1/2008 | Xie ......................... | B62D 11/24 180/252 |
| 2012/0223500 A1* | 9/2012 | Kinsman .................. | B60G 3/20 280/124.153 |
| 2014/0060953 A1* | 3/2014 | Wetterlund ............. | B60K 26/02 180/233 |
| 2014/0217694 A1* | 8/2014 | Fitzwater ................. | B62K 9/00 280/210 |
| 2014/0224561 A1* | 8/2014 | Shinbori .................. | B60G 3/20 180/253 |
| 2014/0225358 A1* | 8/2014 | Shinbori ................. | B60N 3/026 280/779 |
| 2015/0041237 A1* | 2/2015 | Nadeau .................... | B60K 5/00 180/292 |
| 2015/0047917 A1* | 2/2015 | Burt, II .............. | B62D 25/2036 180/292 |
| 2015/0061275 A1* | 3/2015 | Deckard .............. | B60G 21/055 280/788 |

FOREIGN PATENT DOCUMENTS

| | | |
|---|---|---|
| CN | 203601475 U | 5/2014 |
| CN | 203666862 U | 6/2014 |
| CN | 204368366 U | 6/2015 |
| FR | 2604916 A1 | 4/1988 |
| WO | 2006136658 A1 | 12/2006 |

OTHER PUBLICATIONS

Written Opinion of the International Search Authority for PCT/CN2015/098644, dated February, and its English translation provided by Bing.Com Microsoft Translate.

* cited by examiner

CHILD DRIFT CAR

CROSS REFERENCE TO RELATED APPLICATIONS

The present application is the U.S. national phase of PCT Application No. PCT/CN2015/098644 filed on Dec. 24, 2015, which claims a priority to the Chinese patent application No. 201520004819.5 filed on Jan. 6, 2015, the disclosures of which are incorporated herein by reference in their entireties.

TECHNICAL FIELD OF THE INVENTION

The present disclosure relates to a child drift car.

BACKGROUND OF THE INVENTION

The drift rotary car (such as CN203666862U published on Jun. 25, 2014) in the prior art, includes a bottom plate, four universal wheels provided at the four corners of the bottom plate, and a battery and a drive device provided above the bottom plate, a round hole is provided between the two universal wheels in the front of the bottom plate to mount a driving wheel, a bracket is provided above the round hole, a steering shaft is provided in the middle of the bracket, a driving wheel is fixedly connected to and supported by a lower portion of the steering wheel; a direction locking device is fixed on the axle of the universal wheel at the rear end of the bottom plate. The drive device of the prior art is directly connected to the axle of the driving wheel, and when the steering wheel controls the driving wheel to turn, the speed of the driving wheel is affected, so that the drift effect is affected.

SUMMARY OF THE INVENTION

The technical problem to be solved by the present disclosure is to provide an improved child drift car.

To solve the above-mentioned technical problem, a technical scheme employed by the present disclosure is:

a child drift car, comprises a car frame, a wheel assembly arranged on the bottom of the car frame, a seat arranged on the car frame, a driving mechanism and a direction control mechanism; the wheel assembly comprises a driving wheel assembly and a rear wheel assembly, the driving wheel assembly comprises driving wheels and an axle which is fixedly connected to the driving wheels and about which the driving wheels rotates, and the driving mechanism comprises a driver and a transmission device driven by the driver to move; the direction control mechanism comprises a steering column rotatably arranged on the front portion of the car frame, a steering wheel fixedly connected to the steering column, and a steering device separately connected to the steering column and the driving wheel assembly; the driving mechanism further comprises a main shaft rotatably arranged on the car frame about its own axis and driven by the transmission device to rotate, the main shaft is connected to the axle via a universal joint, the rear wheel assembly comprises rear wheels and a rotation shaft for connecting the rear wheels and the car frame, the rotation shaft is provided aslant with respect to the ground.

Preferably, the steering column comprises an upper rod and a lower rod which extend along an up-down direction, a lower end portion of the upper rod and an upper end portion of the lower rod are connected via a universal joint, an upper end portion of the upper rod is fixedly connected to the steering wheel, and a lower end portion of the lower rod is connected to the steering device.

Specifically, the steering device comprises a first connecting rod fixedly connected to the steering column and a second connecting rod rotatably connected to the first connecting rod, the driving wheel assembly further comprises a connector rotatably connected to the car frame, the axle is capable of rotatably passing through the connector, and the connector is rotatably connected to the second connecting rod.

Preferably, the driver is a motor.

Further, the driving mechanism further comprises a foot switch arranged on the car frame for controlling the motor.

Further, the transmission device comprises a first gear fixedly arranged on an output shaft of the motor, a second gear connected to the main shaft, and a chain for connecting the first gear and the second gear in a transmission manner.

Preferably, there are two sets of driving wheel assemblies which are located at the left side and the right side of the bottom of the car frame, respectively.

Further, there are two main shafts which both extend along a left-right direction of the car frame, the driving mechanism further comprises a differential mechanism connected to the transmission device and driven by the transmission device to rotate, an end of each of the two main shafts is connected to the differential mechanism, and the other ends of the two main shafts are connected to the axles of the two driving assemblies via the universal joints, respectively.

Further, the rear wheel comprises a rear wheel base of which a top portion is rotatably connected to a lower end portion of the rotation shaft, a rear wheel axle which is located inside the rear wheel base and of which two end portions are rotatably connected to two sidewalls of the rear wheel base respectively, and a rear wheel body fixedly sleeved over the rear wheel axle.

Further, there are two sets of driving wheel assemblies which are located in the front of the bottom of the car frame, and there are two sets of rear wheel assemblies which are located in the rear of the bottom of the car frame.

The above involved direction terms, such as left, right, upper, lower and the like, are defined according to children sitting inside the child drift car.

The scope of the present disclosure is not limited to technical schemes specifically combined by the above technical features, and should encompass other technical schemes formed by any combination of the above technical features or the equivalent features thereof. For example, the technical schemes are formed by substituting between the above technical features and, but not limited to, the technical features with similar functions disclosed by the present disclosure.

Due to the use of the above technical schemes, the present disclosure has the following advantages over the prior art: in the present disclosure, the axle and the main shaft are connected via a universal joint, such that when the driving wheels turn, the speed of the driving wheels is not affected, and a higher drifting speed can be achieved.

Wherein: 1—car frame; 2—seat; 3—driving wheel; 4—axle; 5—steering wheel; 6—main shaft; 7—universal joint; 8—universal joint; 9—upper rod; 10—lower rod; 11—first connecting rod; 12—second connecting rod; 13—connector; 14—motor; 15—power source; 16—foot switch; 17—second gear; 18—differential mechanism; 19—rotation shaft; 20—rear wheel; 201—rear wheel base; 202—rear wheel axle; 203—rear wheel body.

DETAILED DESCRIPTION OF THE EXEMPLARY EMBODIMENTS

Figure 1:
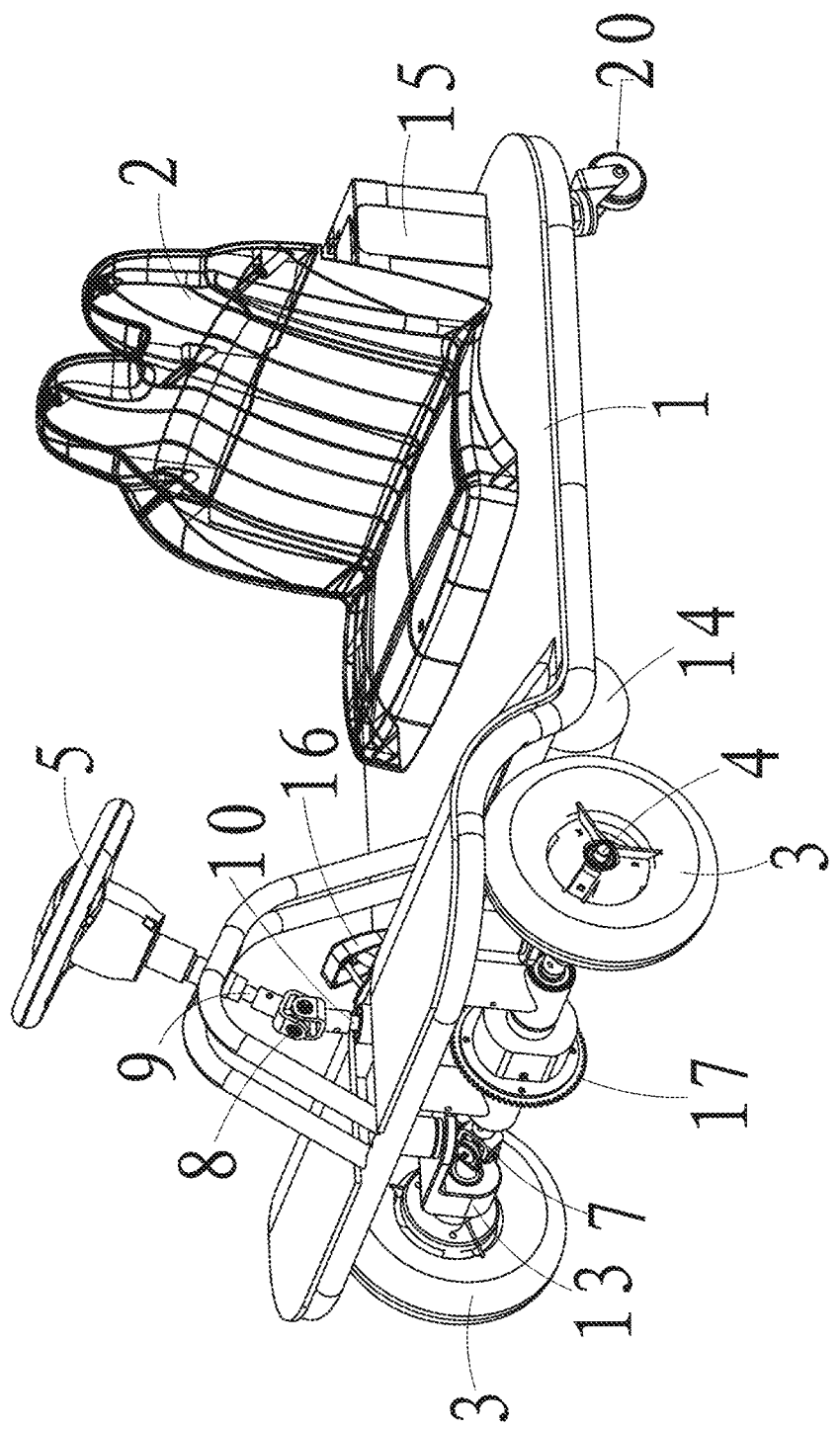
FIG. 1 is a space diagram of the present disclosure (view from the front to the rear)
Figure 2:
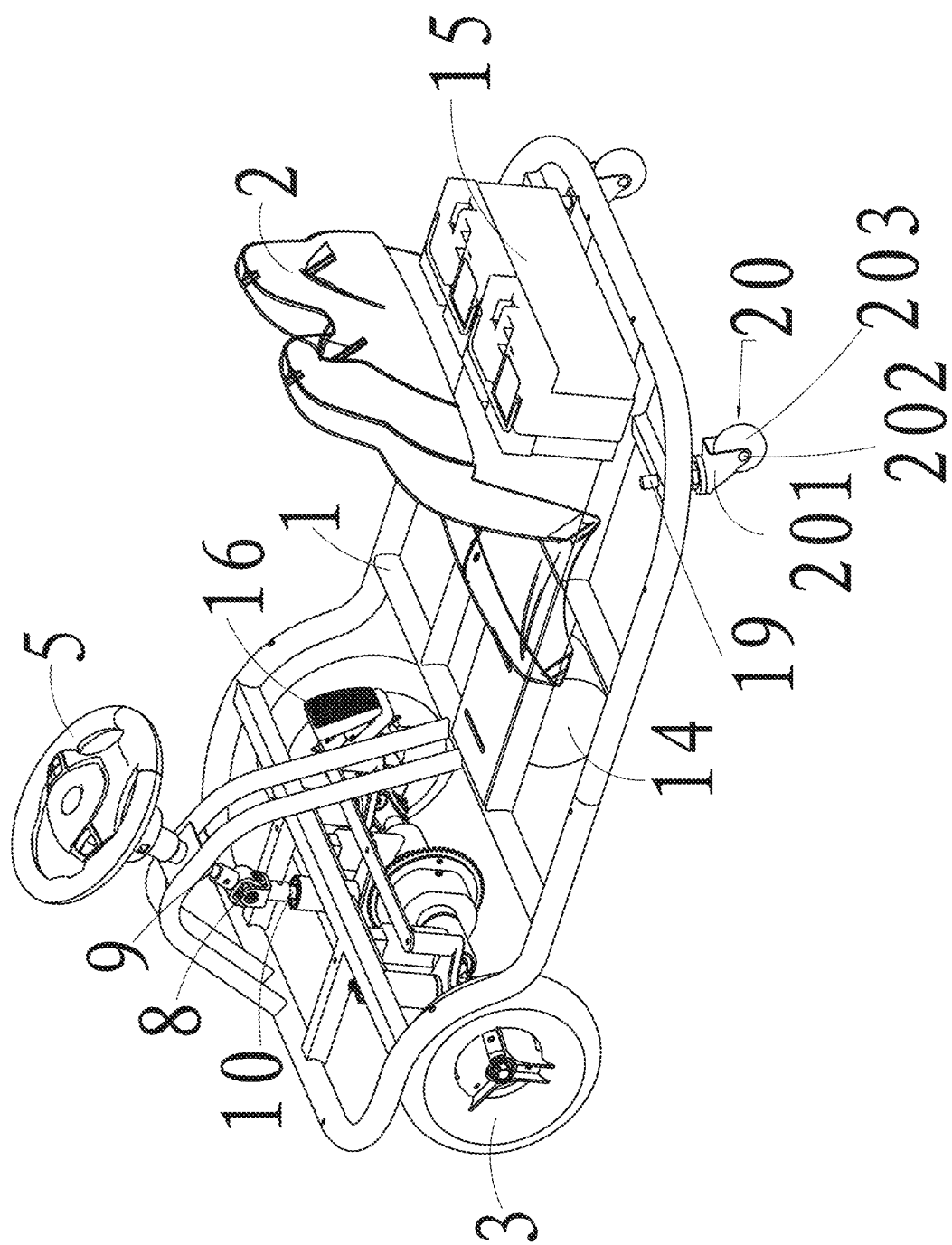
FIG. 2 is a space diagram of the present disclosure (view from the rear to the front)
Figure 3:
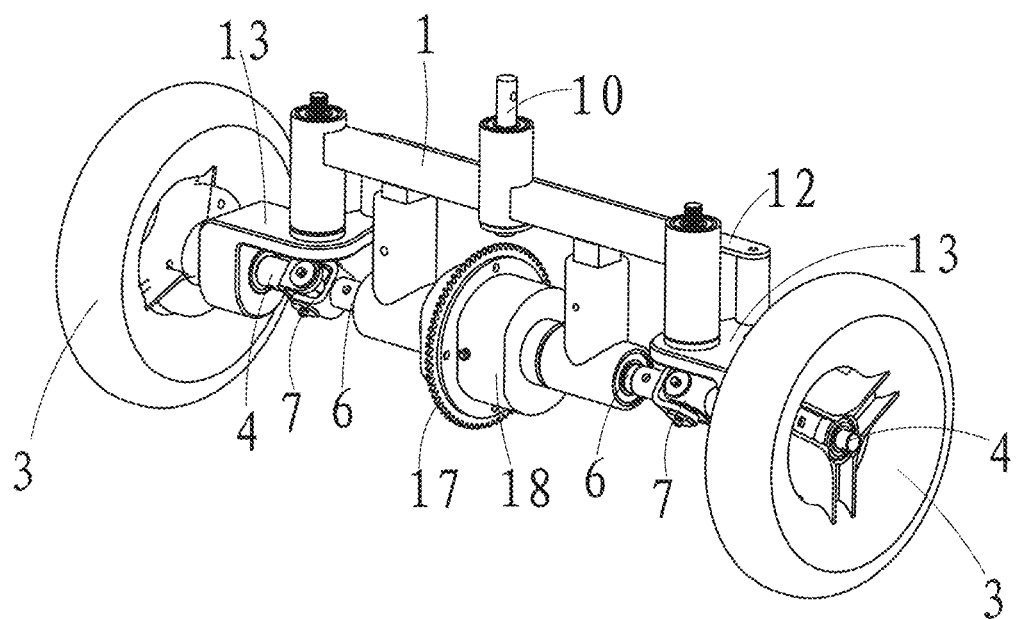
FIG. 3 is a space diagram of a driving wheel assembly, a driving mechanism and a direction control mechanism (view from the front to the rear)
Figure 4:
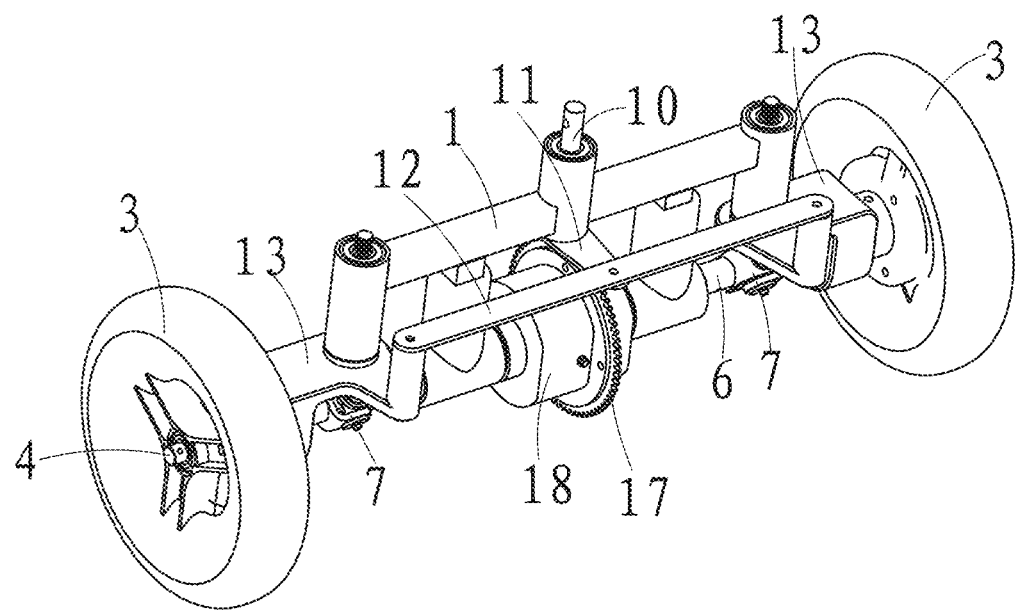
FIG. 4 is a space diagram of a driving wheel assembly, a driving mechanism and a direction control mechanism (view from the rear to the front)

Referring to FIGS. 1 and 2, a child drift car, comprises a car frame 1, a wheel assembly arranged on the bottom of the car frame 1, a seat 2 arranged on the car frame 1, a driving mechanism and a direction control mechanism. The wheel assembly comprises a driving wheel assembly and a rear wheel assembly, there are two sets of driving wheel assemblies which are located at the left side and the right side in the front of the bottom of the car frame 1, respectively, and there are two sets of rear wheel assemblies which are located at the left side and the right side in the rear of the bottom of the car frame 1, respectively.

The driving wheel assembly comprises driving wheels 3 and an axle 4 which is fixedly connected to the driving wheels 3 and about which the driving wheels 3 rotates. The rear wheel assembly comprises rear wheels 20 and a rotation shaft 19 for connecting the rear wheel 20 and the car frame 1, in order to ensure that the child drift car is not affected during running straight, and that turning is flexible during steering and drifting, the rotation shaft 19 is provided aslant with respect to the ground, in particular, the rotation shaft 19 is aslant downward from top to bottom, and the aslant degree is determined according to requirement. The rear wheel 20 comprises a rear wheel base 201 of which a top portion is rotatably connected to a lower end portion of the rotation shaft 19, a rear wheel axle 202 which is located inside the rear wheel base 201 and of which two end portions are rotatably connected to two sidewalls of the rear wheel base 201 respectively, and a rear wheel body 203 fixedly sleeved over the rear wheel axle 202.

As shown in the figures, the direction control mechanism comprises a steering column rotatably arranged on the front portion of the car frame 1, a steering wheel 5 fixedly connected to the steering column, and a steering device separately connected to the steering column and the driving wheel assembly.

The steering device comprises a first connecting rod 11 fixedly connected to the steering column and a second connecting rod 12 rotatably connected to the first connecting rod 11, the driving wheel assembly further comprises a connector 13 rotatably connected to the car frame 1, the axle 4 is capable of rotatably passing through the connector 13, and the connector 13 is rotatably connected to the second connecting rod 12. As shown in the figures, a front end portion of the first connecting rod 11 is fixedly connected to a lower end portion of the steering column, and a rear end portion thereof is rotatably connected to the middle portion of the second connecting rod 12; the second connecting rod 12 extends along the left-right direction of the car frame 1, and two end portions thereof are rotatably connected to two connectors 13 at the left side and the right side, respectively; the rotatable connecting point between the connector 13 and the car frame 1 is in front of the rotatable connecting point between the connector 13 and second connecting rod 12.

In order to achieve the adjustment of the distance between the steering wheel 5 and a person, the steering column comprises an upper rod 9 and a lower rod 10 which extend along an up-down direction, a lower end portion of the upper rod 9 and an upper end portion of the lower rod 10 are connected via a universal joint 8, an upper end portion of the upper rod 9 is fixedly connected to the steering wheel 5, and a lower end portion of the lower rod 10 is connected to the steering device.

The driving mechanism comprises a driver, a transmission device driven by the driver to move, and a main shaft 6 rotatably arranged on the car frame 1 about its own axis and driven by the transmission device to rotate. The driver is a motor 14 provided at the bottom of the car frame 1, and the child drift car further comprises a power source 15 powering the motor 14, in the present embodiment, the power source 15 is a battery mounted at the rear of the seat 2. The driving mechanism further comprises a foot switch 16 arranged on the car frame 1 for controlling the motor 14. The transmission device comprises a first gear fixedly arranged on an output shaft of the motor 14, a second gear 17 connected to the main shaft 6, and a chain for connecting the first gear and the second gear 17 in a transmission manner.

In order to ensure that the speed is not affected when the driving wheel 3 turns, the main shaft 6 is connected to the axle 4 via the universal joint 7.

In order to diminish the turning radius, and make the turning more flexible, the driving mechanism further comprises a differential mechanism 18 connected to the transmission device and driven by the transmission device to rotate, in particular, the second gear 17 is fixedly connected to the differential mechanism 18, and there are two main shafts 6 which both extend along a left-right direction of the car frame 1, an end of each of the two main shafts 6 is connected to the differential mechanism 18, and the other ends of the two main shafts 6 are connected to the axles 4 of the two driving assemblies via the universal joints 7, respectively. The specific structure of the differential mechanism 18 is not the focus protected by the present disclosure, for example, may employ a commercially available differential mechanism, or the differential mechanism disclosed in CN201745693U; the differential mechanism comprises a shell fixed connected to the second gear 17 and having an inner cavity, a locating shaft arranged on the shell and located inside the inner cavity, a first bevel gear rotatably sleeved over a side portion of the locating shaft, a second bevel gear rotatably sleeved over another side portion of the locating shaft, a third bevel gear fixedly connected to one main shaft 6 and located inside the inner cavity, and a fourth bevel gear fixedly connected to another main shaft 6 and located inside the inner cavity, the direction of the axial line of the locating shaft is vertical to the direction of the axial lines of the two main shafts 6, and the direction of the axial lines of the two main shafts 6 is in accordance with the extending direction of the shell, the first bevel gear and the second bevel gear are provided symmetrically, the third bevel gear and the fourth bevel gear are provided symmetrically, and the first bevel gear, the second bevel gear, the third bevel gear and the fourth bevel gear are engaged successively.

The foot switch 16 is a continuously variable switch of which the control manner is not the focus of the current application, only achieves the control of the rotation speed of the motor 14 when the foot switch 16 is stepped on in a different angel, for example, the foot switch 16 and the motor 14 are connected via a sensor, and the sensor is a Hall sensor which includes a Hall element, a first magnetic element and a second magnetic element fixedly arranged on the foot switch 16, between the first magnetic element and the second magnetic element being formed a space, the Hall element is located inside the space.

Working principle: the motor 14 is connected to the power source 15, and when running straight, the steering wheel 5 is not rotated, the foot switch 16 is stepped on, the motor 14 rotates and drives the first gear to rotate, the second gear 17 is driven to rotate by the first gear via the chain wheel, and the differential mechanism 18 is further driven to rotate by the second gear 17, and at present, due to that the two driving wheels 3 are suffered from substantially the same driving resistance during running straight, the differential mechanism 18 does not work, and the two main shafts 6 rotate in the same rotation speed driven by the differential mechanism 18, such that the two sets of driving wheel assemblies rotate in the same speed, and the child drift car runs straight.

When turning, the steering wheel 5 is rotated, and the steering column is driven to rotate by the steering wheel 5, such that the first connecting rod 11 is driven to rotate, and the second connecting rod 12 is driven by the first connecting rod 11 to move along the left-right direction, such that the two sets of driving wheel assemblies are driven to turn, the foot switch 16 controls the motor 14 to rotate, and the motor 14 drives the differential mechanism 18 to rotate via the first gear, the chain and the second gear 17, the differential mechanism 18 drives the two sets of driving wheel assemblies to rotate via the two main shafts 6, due to that when turning, the driving resistance suffered by the driving wheel 3 in the inner side is larger than the driving resistance suffered by the driving wheel 3 in the outer side, such that the rotation speed of the driving wheel 3 in the inner side is lower than that of the shell of the differential mechanism 18, and the differential mechanism 18 works, such that under the action of the first bevel gear, the second bevel gear, the third bevel gear and the fourth bevel gear, the rotation speed of the driving wheel 3 in the outer side increases, and is higher than that of the shell of the differential mechanism 18, such that it is achieved that the rotation speed of the driving wheel 3 in the outer side is higher than that of the driving wheel 3 in the inner side, and the child drift car achieves turning in a smaller turning radius.

When drifting, when the rotation speed of the drive wheels 3 reaches a relative large value and the turning angle of the steering wheel 5 is relatively large during a straight running, the child drift car realizes the drift.

As above described, the present disclosure is explained according to the purpose thereof, but the present application is not limited to the above-mentioned embodiments and implement methods. Various variations and implementations can be made by the practitioners of the relative technical fields within the technical concept of the present disclosure.

The invention claimed is:

1. A child drift car, comprising a car frame, a wheel assembly arranged on the bottom of the car frame, a seat arranged on the car frame, a driving mechanism and a direction control mechanism; the wheel assembly comprising a driving wheel assembly and a rear wheel assembly, the driving wheel assembly comprising driving wheels and an axle which is fixedly connected to the driving wheels and about which the driving wheels rotates, the driving mechanism comprising a driver and a transmission device driven by the driver to move, the direction control mechanism comprising a steering column rotatably arranged on the front portion of the car frame, a steering wheel fixedly connected to the steering column, and a steering device separately connected to the steering column and the driving wheel assembly, wherein, the driving mechanism further comprises a main shaft rotatably arranged on the car frame about its own axis and driven by the transmission device to rotate, the main shaft is connected to the axle via a universal joint, the rear wheel assembly comprises rear wheels and a rotation shaft for connecting the rear wheels and the car frame, the rotation shaft is provided aslant with respect to the ground, the steering device comprises a first connecting rod fixedly connected to the steering column and a second connecting rod rotatably connected to the first connecting rod, the driving wheel assembly further comprises a connector rotatably connected to the car frame, the axle is capable of passing through the connector, the connector is rotatably connected to the second connecting rod; wherein the second connecting rod is directly connected to the first connecting rod and directly connected to the connector.

2. The child drift car according to claim 1, wherein, the steering column comprises an upper rod and a lower rod which extend along a up-down direction, a lower end portion of the upper rod and an upper end portion of the lower rod are connected via a universal joint, an upper end portion of the upper rod is fixedly connected to the steering wheel, and a lower end portion of the lower rod is connected to the steering device.

3. The child drift car according to claim 1, wherein, the driver is a motor.

4. The child drift car according to claim 3, wherein, the driving mechanism further comprises a foot switch arranged on the car frame for controlling the motor.

5. The child drift car according to claim 3, wherein, the transmission device comprises a first gear fixedly arranged on an output shaft of the motor, a second gear connected to the main shaft, and a chain for connecting the first gear and the second gear in a transmission manner.

6. The child drift car according to claim 1, wherein, there are two sets of driving wheel assemblies which are located at the left side and the right side of the bottom of the car frame, respectively.

7. The child drift car according to claim 6, wherein, there are two main shafts which both extend along a left-right direction of the car frame, the driving mechanism further comprises a differential mechanism connected to the transmission device and driven by the transmission device to rotate, an end of each of the two main shafts is connected to the differential mechanism, and the other ends of the two main shafts are connected to the axles of the two driving assemblies via the universal joints, respectively.

8. The child drift car according to claim 1, wherein, the rear wheel comprises a rear wheel base of which a top portion is rotatably connected to a lower end portion of the rotation shaft, a rear wheel axle which is located inside the rear wheel base and of which two end portions are rotatably connected to two sidewalls of the rear wheel base respectively, and a rear wheel body fixedly sleeved over the rear wheel axle.

9. The child drift car according to claim 1, wherein, there are two sets of driving wheel assemblies which are located in the front of the bottom of the car frame, and there are two sets of rear wheel assemblies which are located in the rear of the bottom of the car frame.

* * * * *